United States Patent
Runels

(10) Patent No.: US 6,957,725 B2
(45) Date of Patent: Oct. 25, 2005

(54) AUTOMOTIVE DISC BRAKE

(75) Inventor: Thomas L. Runels, Battle Creek, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/370,160

(22) Filed: Feb. 19, 2003

(65) Prior Publication Data

US 2004/0178026 A1      Sep. 16, 2004

(51) Int. Cl.[7] .......................... G01M 1/00; F16O 65/10
(52) U.S. Cl. ................ 188/218; 188/218 R; 188/18 A; 188/73.35
(58) Field of Search ..................... 188/218 XL, 218 R, 188/18 A, 73.35, 73.32, 73.37

(56) References Cited

U.S. PATENT DOCUMENTS

| | | | |
|---|---|---|---|
| 3,603,434 A | 9/1971 | Leroux | |
| 3,687,244 A * | 8/1972 | Hillegass et al. | 188/218 |
| 4,379,501 A | 4/1983 | Hagiwara et al. | |
| 4,523,666 A | 6/1985 | Murray | |
| 4,867,284 A * | 9/1989 | Okamura et al. | 188/218 |
| 6,131,707 A * | 10/2000 | Buechel et al. | 188/218 |
| 6,142,267 A * | 11/2000 | Sporzynski et al. | 188/218 |
| 6,279,698 B1 * | 8/2001 | Oberti | 188/218 |
| 6,575,030 B1 * | 6/2003 | Lauf et al. | 73/487 |

FOREIGN PATENT DOCUMENTS

FR          2698425        * 5/1994

* cited by examiner

Primary Examiner—Matthew C. Graham
(74) Attorney, Agent, or Firm—Dykema Gossett PLLC

(57) ABSTRACT

A disc brake rotor is provided which is balanced by removal of metal from between two opposed friction faces of the rotor. The friction faces are provided by two discs which are separated from each other by radially extending ribs.

7 Claims, 2 Drawing Sheets

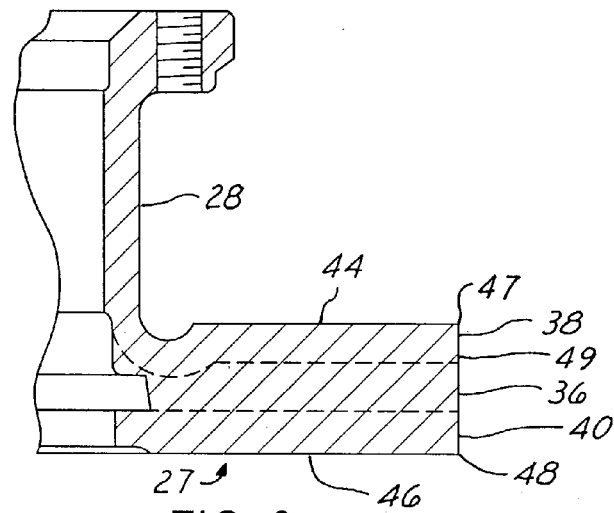
FIG. 3
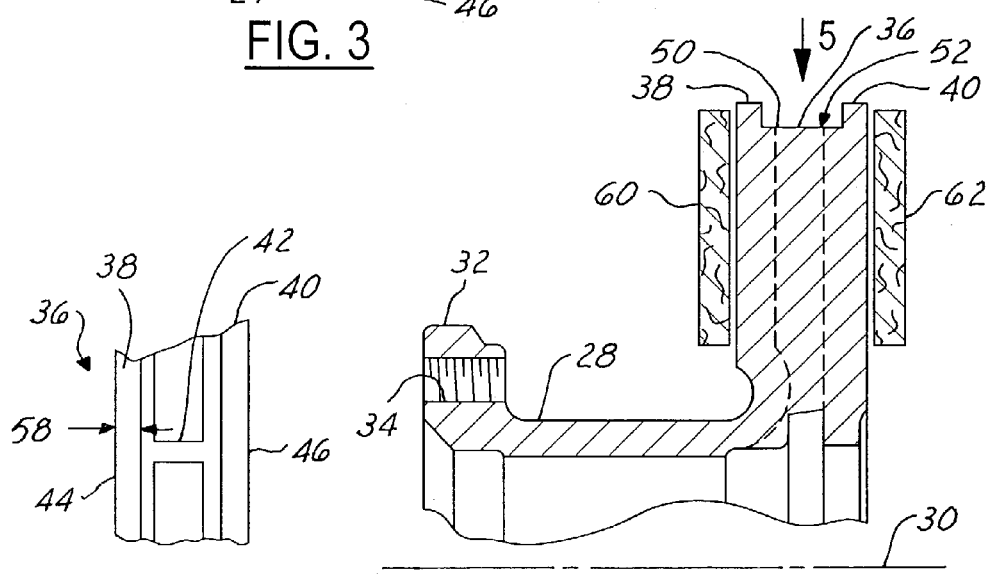
FIG. 5
FIG. 4

AUTOMOTIVE DISC BRAKE

FIELD OF THE INVENTION

The field of the present invention is that of disc brakes. More particularly, the field of the present invention is that of automotive disc brakes and disc brake rotors and methods of manufacturing thereof.

BACKGROUND OF THE INVENTION

Most automotive vehicles currently produced have disc brakes on at least the front wheels. Additionally, many automotive vehicles including trucks now include disc brakes on the rear wheels. The majority of disc brakes include a rotor which is attached to the vehicle wheel via a hub. Extending radially outward from the hub is a braking portion. The braking portion typically includes two discs. A inner disc is typically directly connected to the hub along its inner diameter. An outer disc is spaced away from the inner disc and is connected to the inner disc by a plurality of radial ribs. The ribs have two functions. First, to connect the outer disc to the inner disc, and second, to provide a flow path between the discs to allow for air cooling of the rotor. The first and second discs provide opposed surfaces first and second friction faces. The friction faces are engaged by inner and outer brake pads. The brake pads engage the friction surfaces in response to a fluid actuated brake caliper. The brake caliper is supported by the vehicle suspension system to be adjacent to the rotating rotor.

Since the rotor is attached to the wheel, it is required that the rotor be balanced. Many rotors are fabricated by a gray iron casting process. Therefore most rotors require a balancing correction after finish machining. To balance the rotor, typically the peripheral outer diameter edges are machined. The machining of the disc rotor causes the friction faces of the rotor to have a non-constant radius outer diameter.

To achieve aerodynamic efficiency, the hood and roof heights of automotive vehicles have been reduced. Accordingly, the space envelope between the top of the wheel well and the disc brake caliper has been minimized. To achieve maximum brake pad wear life, the engagement surface area of the brake pads should be as large as practically possible. However, from a noise wear and vibration standpoint, the engagement surface area with the brake pads should be constant regardless of the angular orientation of the rotor. When the rotor has been balanced by circumferentially machining off a part of its perimeter at the outer diameter of the rotor, the brake pads will have the situation of fluctuating engagement area with the rotor depending upon the rotor's angular orientation. This situation of non-constant area engagement can be a generator of undesirable wear and noise. The noise parameter is especially critical in providing a commercially attractive product.

One way to avoid shaving off the perimeter of the rotor to achieve balancing is to add weights to the rotor. The addition of weights is undesirable due to the possibility of their breaking off after prolonged periods of use. Additionally, it is difficult to weld on weights or add weights by virtue of a weld bead due to the metallurgical properties of many of the rotors. Accordingly, it is desirable to provide a method of balancing disc brake rotors while providing friction surfaces which have a constant radius outer diameter with a radial center coterminous with the axis of the rotor without requiring the connection of additional weight to the rotor.

SUMMARY OF THE INVENTION

To make manifest the above noted desire, a revelation of the present invention is brought forth. In a preferred embodiment, the present invention provides a rotor having friction surfaces with constant radius outer diameters having a radial center coterminous with the radial center of the rotor and wherein the rotor is balanced by removal of material from the braking portion of the rotor between the braking surfaces. Balancing is achieved without the addition of weights. The present invention allows for a disc brake assembly wherein the pads can have a constant engagement surface area contact with the rotor thereby minimizing undesirable noise and vibration.

Other advantages of the present invention will be further revealed as the present invention is further explained by the accompanying drawings and detailed descriptions.

BRIEF DESCRIPTION OF THE DRAWINGS

FIG. 3 is a sectional view of the disc brake rotor shown in FIG. 2 taken along lines 3—3.

FIG. 4 is a sectional view taken along lines 4—4 of FIG. 2 which additionally illustrates placements of the friction pad adjacent to the rotor.

FIG. 5 is a partial top elevational view illustrating the rotor shown in FIGS. 2–4.

DETAILED DESCRIPTION OF THE INVENTION

Figure 1:
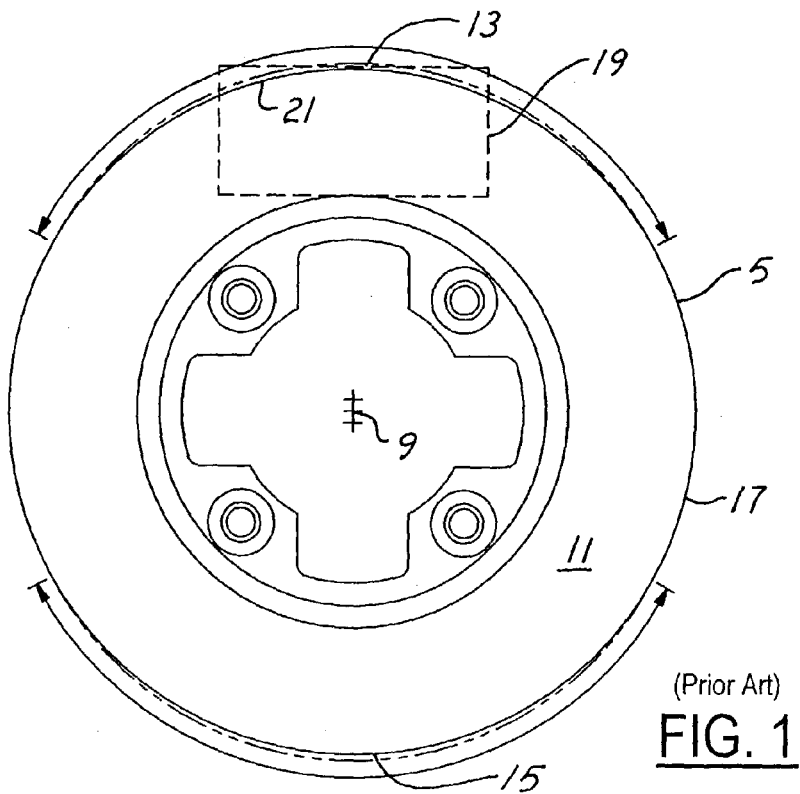
FIG. 1 is a front elevational view of a prior art disc brake rotor.

Referring to FIG. 1, a prior art disc brake rotor 5 is shown. The disc brake rotor 5 has an axial center 9. The disc brake rotor 5 also has a friction face 11. To balance the disc brake rotor 5, there are eccentric circumferential grooves 13 and 15 made on its outer peripheral diameter 17. Accordingly, a friction pad 19 (shown in phantom) will have an area or a zone 21 which will on an alternating basis have engagement with the brake face 11. This alternating zone contact with the pad 19 can be a source of undesirable noise, vibration or wear.

Predicting this zone 21 of non-constant contact is difficult because it is dependent upon how much friction face 11 has to be machined to achieve proper balancing. This will vary from disc brake to disc brake.

Figure 2:
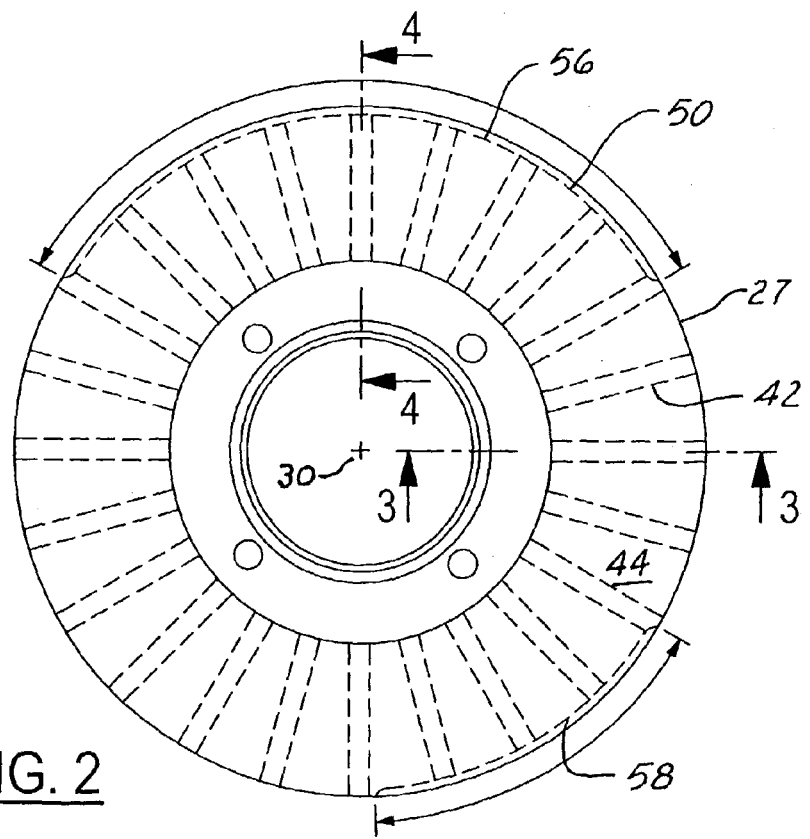
FIG. 2 is a front elevational view of a disc brake rotor according to the present invention.

Referring to FIGS. 2–5, a rotor 27 is provided. The rotor 27 has a hub portion 28. The hub 28 is disposed about a first axis 30. Along one end of the hub 28 there is a base flange 32. The base flange 32 has a series of threaded bores 34 that allow the rotor 27 to be threadably connected with a vehicle wheel (not shown). The hub is connected with a braking portion 36. The braking portion 36 extends radially from the hub 28. The braking portion 36 includes a first disc 38. The disc 38 is integrally joined to the hub 28. The braking portion also includes a second disc 40. The second disc 40 is axially separated away from the first disc 38. The second disc 40 is supported from the first disc 38 via a plurality of radially extending ribs 42. As best shown in FIG. 2, the ribs 42 are generally equal geometrically equilaterally spaced however they need not be. In other embodiments, the ribs can be a curving design. The ribs 42 have two major functions. First, they connect the second disc 40 with the first disc 38, and second, they allow air flow through the braking portion 36 to cool the disc brake rotor 27.

The disc brake rotor 27 on the first disc 38 has a first friction face 44. The friction face 44 has an outer diameter 47 which has a generally constant radius with a radial center which is coterminous with the first axis 30. Opposed the first friction face 44 is a second friction face 46. The second friction face 46 also has an outer diameter 48 which has a constant radius with a radial center coterminous with the first axis 30.

In fabrication of the rotor 27, the hub and disc are typically fabricated from a casting. The bores 34 are drilled and threaded and the friction faces 44 and 46 are finish machined. Typically, a peripheral edge or outer diameter 49 of the discs is machined before the rotor 27 is machined for balancing. The outer diameter 49 will define the diameters 47 and 48 or will be concentric therewith.

After completion of the various finishing operations, the rotor 27 is now ready to be balanced. The rotor typically will be held in a static fashion or will be preferably rotated for a balancing operation to determine the need and location(s) for mass removal. To remove the material an arcuate groove 50 will be machined in the braking portion 36 between the friction faces 44 and 46. The grooves 50 in many applications will have an inner diameter 52 for the major portion of their length which will have a constant radius with a radial center coterminous with the first axis 30. The arcuate groove 50 may be made along a first location 56 and along a second location 58 to provide the mass removal in segments if desired. The groove 50 may optionally remove material from the first disc 38, the rib 42 or the second disc 40 as required. Typical depths of the groove 50 have been found to be in the neighborhood of $3/10^{th}$ of an inch plus or minus $3/100^{th}$ of an inch. Thickness parameters dependent upon disc size will be made for the minimum thickness 58 for the first disc 38 and in a similar fashion for the second disc 40.

Referring to FIG. 4 which illustrates a disc brake according to the present invention, the pads 60 and 62 will have a constant surface area engagement with respective friction surfaces 44 and 46 with the rotor according to the present invention. No surface of the friction pads will have alternating periods of engagement and non-engagement with its respective friction surface thereby eliminating a possible source of undesired vibration or noise.

Applicant has shown the embodiment of the present invention, however, it will be apparent to those skilled in the art of various changes and modifications which can be made to the present invention without departing from the spirit or scope of the invention as it is defined by the accompanying claims.

What is claimed is:

1. A method of balancing a disc brake rotor, comprising the steps of:

providing a rotor having a hub portion disposed about a first axis and a braking portion extending radially from said hub portion, said braking portion including first and second discs separated by a plurality of radially extending ribs, said first and second discs having opposed first and second friction faces; and machining an arcuate groove in said braking portion between said first and second friction faces wherein said machining of said arcuate groove includes removal of material from at least one disc and rib.

2. A method as described in claim 1, wherein said friction faces have a constant radius outer diameter with a radial center coterminous with said first axis.

3. A method as described in claim 1, wherein said arcuate groove machined between said first and second friction faces has a generally constant radius inner diameter with a radial center coterminous with said first axis.

4. A method as described in claim 1, further including machining a plurality of arcuate grooves in said braking portion between said first and second friction faces.

5. A method of producing a disc brake rotor comprising:

fabricating a rotor having a hub portion disposed about a first axis and a braking portion extending radially from said hub portion, said braking portion including first and second discs separated along said first axis by a plurality of radially extending ribs;

machining opposed first and second friction faces on said respective first and second discs, said friction faces having a generally constant radius outer diameter with a radial center coterminous with said first axis; and machining an arcuate groove in said braking portion between said first and second faces to balance said disc brake rotor wherein said machining of said arcuate groove includes removal of material from at least one disc and rib.

6. A method as described in claim 5, wherein said rotor is fabricated by casting.

7. A method as described in claim 5, further including machining a peripheral edge of said first and second disc to be concentric with said outer diameter of said first and second friction faces before said machining of said arcuate groove in said braking portion to balance said rotor.

\* \* \* \* \*